United States Patent
Lenning

(10) Patent No.: US 7,644,798 B2
(45) Date of Patent: Jan. 12, 2010

(54) SAFETY ARRANGEMENT

(75) Inventor: Anders Lenning, Kungsbacka (SE)

(73) Assignee: Autoliv Development AB, Vargarda (SE)

( * ) Notice: Subject to any disclaimer, the term of this patent is extended or adjusted under 35 U.S.C. 154(b) by 435 days.

(21) Appl. No.: 10/589,908

(22) PCT Filed: Jan. 19, 2005

(86) PCT No.: PCT/SE2005/000051

§ 371 (c)(1),
(2), (4) Date: Nov. 7, 2006

(87) PCT Pub. No.: WO2005/073034

PCT Pub. Date: Aug. 11, 2008

(65) Prior Publication Data

US 2007/0114768 A1    May 24, 2007

(30) Foreign Application Priority Data

Feb. 2, 2004    (GB) .................................. 0402246.3

(51) Int. Cl.
*B60R 21/00* (2006.01)
(52) U.S. Cl. ........................ 180/268; 280/735; 280/806; 701/45
(58) Field of Classification Search .................. 280/735, 280/740, 806; 180/740, 268; 701/45
See application file for complete search history.

(56) References Cited

U.S. PATENT DOCUMENTS

| | | | | |
|---|---|---|---|---|
| 4,925,212 A | * | 5/1990 | Motozawa | 280/807 |
| 5,413,378 A | * | 5/1995 | Steffens et al. | 280/735 |
| 5,670,853 A | * | 9/1997 | Bauer | 318/286 |
| 5,787,377 A | * | 7/1998 | Watanabe et al. | 701/45 |
| 6,125,313 A | * | 9/2000 | Watanabe et al. | 701/45 |
| 6,213,510 B1 | * | 4/2001 | Suyama | 280/805 |
| 6,283,503 B1 | * | 9/2001 | Breed et al. | 280/735 |
| 6,443,488 B1 | * | 9/2002 | Kippelt et al. | 280/735 |

FOREIGN PATENT DOCUMENTS

| | | |
|---|---|---|
| DE | 199 46 072 A1 | 3/2001 |
| GB | 2 236 419 A | 4/1991 |
| WO | WO 94/22693 | 10/1994 |
| WO | WO 99/24291 | 5/1999 |

OTHER PUBLICATIONS

Patent Abstracts of Japan, vol. 1998, No. 02.

* cited by examiner

*Primary Examiner*—Paul N. Dickson
*Assistant Examiner*—Timothy Wilhelm
(74) *Attorney, Agent, or Firm*—Brinks Hofer Gilson & Lione

(57) ABSTRACT

A safety arrangement for detecting the position of an occupant (4) of a seat (1) which is provided with a safety belt (9) which is mounted on a retractor (10) includes a sensor (11) which measures the length of belt withdrawn from the retractor The sensor is associated with a processor unit (8) which is associated with a seat position sensor (7). By determining the position of the seat and by determining the minimum length of belt paid-out from the retractor (10) after the seat belt has been buckled in position, and by determining how additional belt has been paid-out at any incident, the position of the seat occupant (4) relative to an air-bag (19) can be determined. If the seat occupant is very close to the air-bag, the nature of deployment of the air-bag can be moderated by the central processor unit (8).

24 Claims, 3 Drawing Sheets

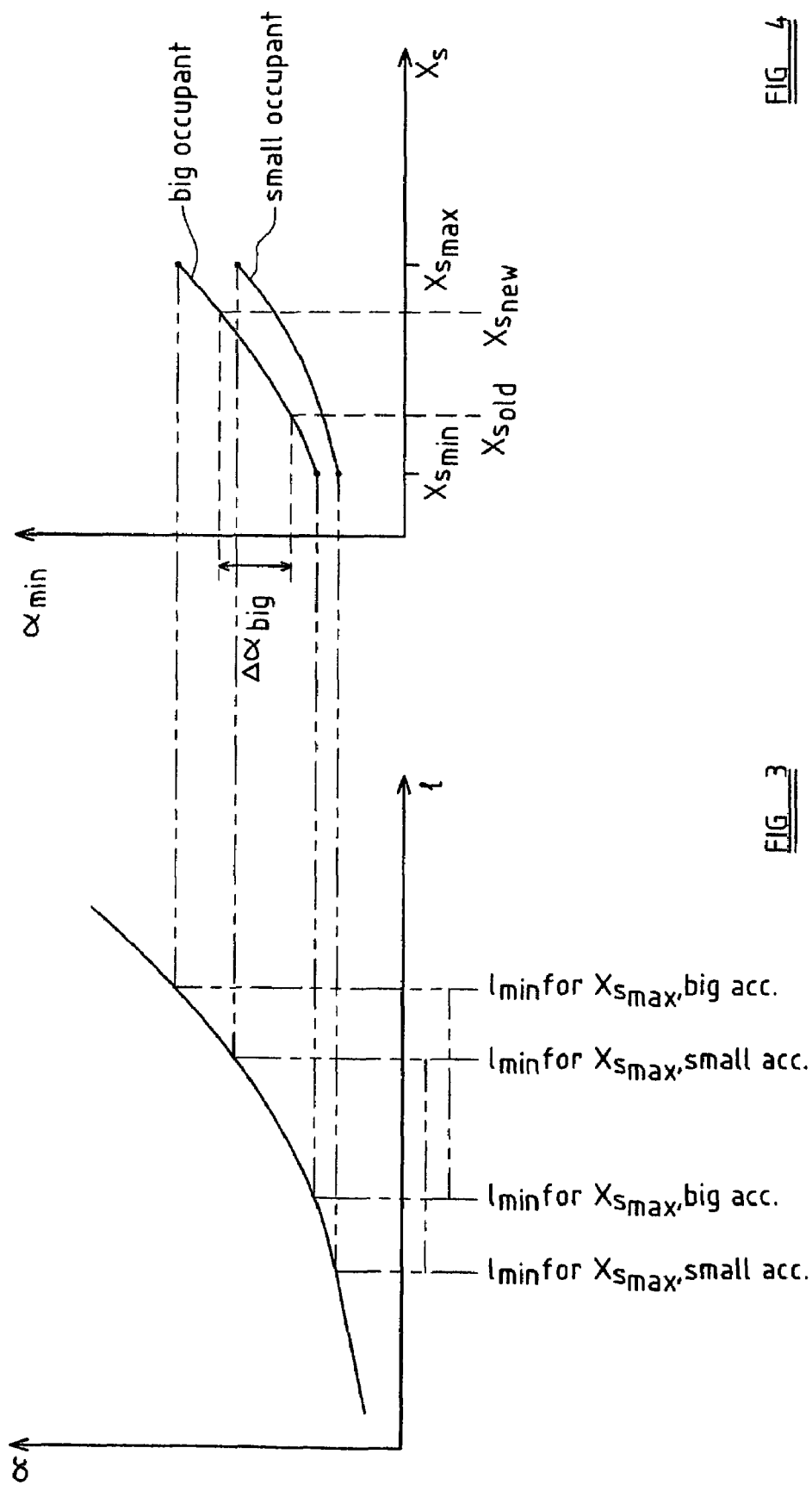

SAFETY ARRANGEMENT

CROSS REFERENCE TO RELATED APPLICATIONS

This application claims priority to Great Britain patent application number 0402246.3, filed Feb. 2, 2004 and PCT/SE2005/000051, filed Jan. 19, 2005.

FIELD OF THE INVENTION

The present invention relates to a safety arrangement and more particularly relates to a safety arrangement to provide protection for a passenger in a motor vehicle.

BACKGROUND AND SUMMARY OF THE INVENTION

It has been proposed to provide an air-bag located in front of a passenger in a motor vehicle, the air-bag being arranged to be inflated in case of an impact involving the vehicle to provide protection for the occupant.

It is known that whilst such an air-bag may provide good protection for a seat occupant who, at the instant of impact, is sitting in an "ordinary" position, nevertheless, the air-bag may not operate optimally for a seat occupant who, at the moment of impact, is not in the ordinary position, but, instead, is leaning forwards, for example to gain access to a glove box.

It has been proposed that an arrangement should be provided to detect when a vehicle occupant is out of the ordinary position and to moderate inflation of the air-bag, or even inhibit inflation of the air-bag, in such a situation.

Various proposals have been made previously concerning detectors to detect when a vehicle occupant is out of position. Suggestions have been made involving the use of capacitive sensors, the electric capacity of such sensors depending upon the proximity of various parts of the occupant. It has also been proposed to use various sensors which use transmitted waves, such as infrared or ultrasonic sensors, with the sensors being used in the manner of a radar or "echo sounder" to determine the position of the occupant. Such sensors are expensive, or complicated, or unreliable.

It has also been proposed to utilise a sensor which determines the length of the safety belt, as worn by the vehicle occupant, that has been withdrawn from the retractor on which the safety belt is initially stored. However, even a sensor of this type does not, of itself, provide a reliable indication of the position of the occupant.

The present invention seeks to provide an improved safety device.

According one aspect of this invention there is provided a safety arrangement for detecting the position of an occupant of a seat in a motor vehicle, the seat being provided with a safety belt and an associated retractor for use by the occupant of the seat, there being a sensor for measuring a parameter corresponding to the length of belt withdrawn from the retractor relative to a predetermined reference value, the safety arrangement also incorporating a seat position sensor and a processor unit to process signals from the two sensors to evaluate the position of the seat occupant, wherein the safety belt system incorporates a buckle, the buckle being provided with a sensor to indicate when the safety belt is buckled in position, the predetermined reference value being the minimum belt length remaining withdrawn from the retractor after the belt has been buckled up.

Preferably the processor unit utilises signals from the seat position sensor to determine the ordinary position of the front part of the chest bone of a seat occupant relative to an air-bag, that position corresponding to the predetermined reference value of belt length.

According to another aspect of this invention there is provided a safety arrangement for detecting the position of an occupant of a seat in a motor vehicle having a fixed position, the seat being provided with a safety belt and an associated retractor for use by the occupant of the seat, there being a sensor for measuring a parameter corresponding to the length of belt withdrawn from the retractor relative to a predetermined reference value. The safety arrangement also incorporating a processor unit to process signals from the sensor to evaluate the position of the seat occupant, wherein the safety belt system incorporates a buckle, the buckle being provided with a sensor to indicate when the safety belt is buckled in position, the predetermined reference value being the minimum belt length remaining withdrawn from the retractor after the belt has been buckled up.

Preferably the processor unit, based on the position of the seat, determines the ordinary position of the front part of the chest bone of a seat occupant relative to an air-bag, that position corresponding to the predetermined reference value of belt length.

Conveniently the reference value is continuously or repeatedly updated, and a new reference value is stored whenever a new minimum belt length remaining withdrawn from the retractor, which is less than the current minimum length, is determined.

Advantageously a measured change in the length of the belt withdrawn from the retractor, relative to the predetermined reference value is utilised, by the processor unit, to estimate the longitudinal change in position of the front part of the chest bone of the seat occupant.

Preferably the parameter that is measured is the extent of the angular rotation of the spool of the seat belt retractor.

In one embodiment the processor unit is connected to control the performance of a load-limiter for the safety-belt.

In a preferred embodiment the processor unit is connected to an air-bag unit positioned in front of the vehicle seat to control the mode of performance of the air-bag.

Conveniently the processor unit modifies the venting of the air-bag.

Alternatively the processor unit moderates deployment of the air-bag.

Alternatively again the processor unit inhibits deployment of the air-bag.

Preferably the processor unit is configured to determine a new reference value whenever the seat is moved after the predetermined reference value has been determined.

Advantageously the new reference value is determined by determining the minimum length of belt withdrawn from the retractor after the seat is moved, the processor being configured to process signals corresponding to the new minimum belt length and the new position of the seat.

Preferably the new reference value is determined by determining the change in the position of the seat and modifying the original predetermined reference value.

Conveniently the reference value is modified by a value corresponding to the distance of, and the direction of, the change in position of the seat.

Conveniently subsequently a new reference value is determined by determining the minimum length of belt withdrawn from the retractor and the position of the seat.

BRIEF DESCRIPTION OF THE DRAWINGS

In order that the invention may be more readily understood, and so that further features thereof may be appreciated, the invention will now be described, by way of example, with reference to the accompanying drawings in which:

FIG. 3 is a graphical figure for purposes of explanation of the invention; and

FIG. 4 is a further graphical figure related to FIG. 3.

DETAILED DESCRIPTION OF THE INVENTION

Figure 1:
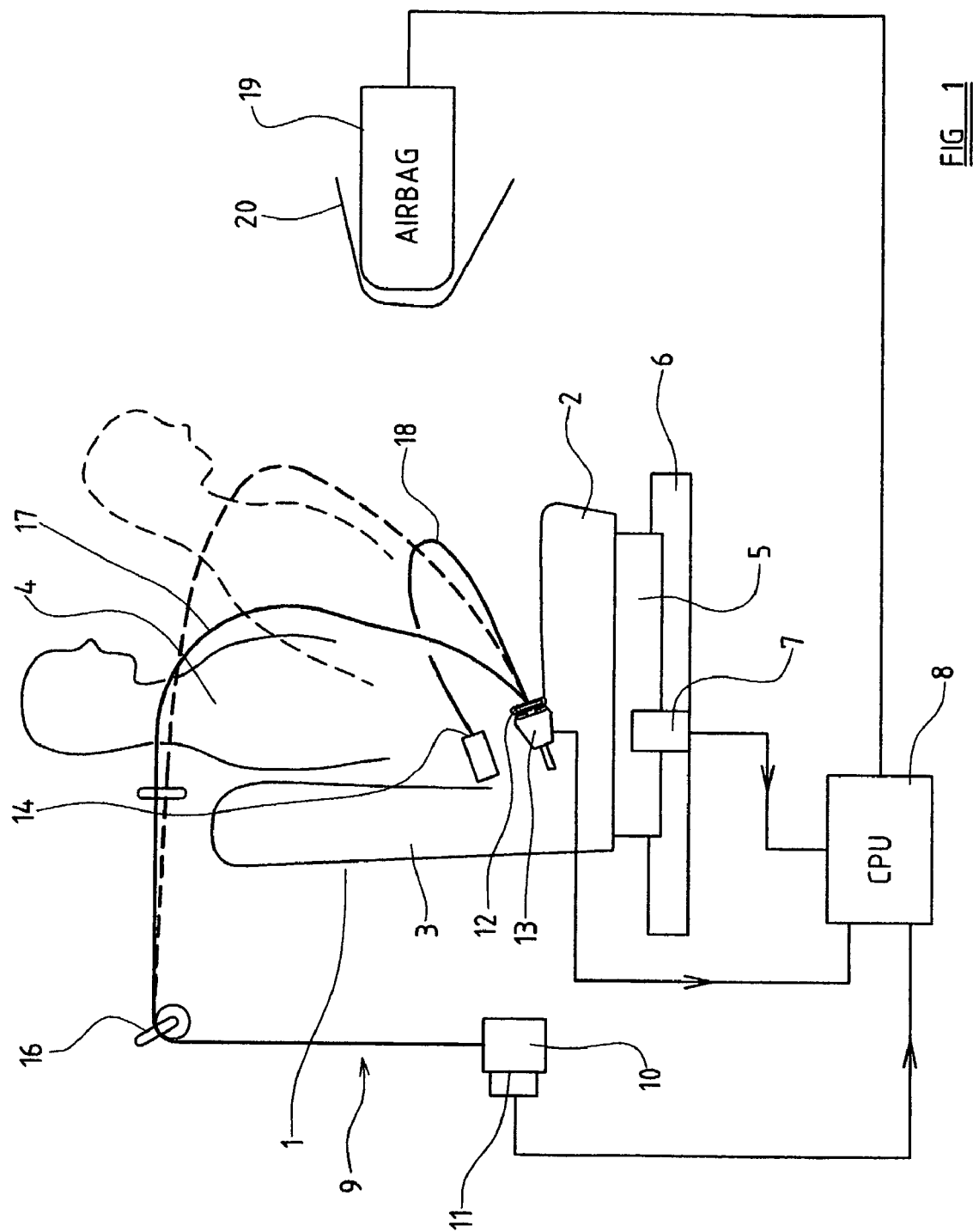
FIG. 1 is partly a side view of a vehicle seat illustrating the seat occupant and partly a diagrammatic view of components of the present invention.

Looking initially at FIG. 1 of the accompanying drawings a seat 1 in a motor vehicle is illustrated, the seat having a seat cushion or squab 2 and a back rest 3. The seat occupant 4 is indicated, the seat occupant having an ordinary position shown in generally solid lines and a leaning forward or "out of ordinary position" shown in phantom.

The seat 1 is mounted on a seat frame or carriage 5, the carriage 5 being moveable along a track 6 which is secured in position to the floor of the vehicle. A sensor 7 is provided which senses the position of the carriage 5 relative to the track 6. The output of the sensor 7 is forwarded to a central processor unit 8.

A seat-belt 9 is provided which is associated with the seat 1. The seat-belt 9 is initially stored within a retractor 10. The retractor 10 is provided with a measuring mechanism 11 to measure the amount of seat-belt withdrawn from the retractor. The mechanism may take many forms and may, for example, be a mechanism which actually measures the length of belt paid out using a rotating measuring wheel or the like which engages the belt, or may include a mechanism which measures the diameter of the safety belt remaining wound on the spool of the retractor mechanism.

However, a preferred arrangement includes an optical sensor, the optical sensor being located adjacent a plurality of axially extending alternating segments of different colour which extend as a band around part of the spool of the retractor 10. As the spool winds in and out, so the different coloured bands pass adjacent the sensor, and the sensor can sense the presence of the bands and the direction of movement of the bands. Thus the sensor can provide signals to the central processor unit 8, the central processor unit 8 being able to determine the extent of angular rotation of the spool, thus being able to determine the amount of safety belt that is retracted into the spool and/or paid out from the spool. Alternatively axially or radially extending magnetic strips could be utilised, in conjunction with a sensor such as a Hall effect sensor.

The retractor 10 may incorporate a load-limiter. The load-limiter may operate to pay-out a length of belt, if the force in the belt exceeds a limit, while absorbing energy. Various types of load-limiter which operate in this way have been proposed before. The load-limiter may be a controlled load-limiter.

The safety belt 9 is provided with a latch plate or tongue 12, the tongue 12 being releasably received within a buckle 13.

The buckle 13 is provided with a sensor mechanism to determine whether the tongue 12 is or is not engaged within the buckle 13. The mechanism sends an appropriate signal to the central processor unit 8. The free end of the safety belt 9 is provided with an anchorage 14 which is fixed to the chassis. The buckle 13 is located to one side of the vehicle seat and the anchorage 14 is located towards the other side of the vehicle seat, being the side of the vehicle seat where the retractor 10 is provided.

The safety belt 9, on emerging from the retractor 10 passes through a pillar loop guide 16 before passing over one shoulder of the seat occupant 4, the belt presenting a portion 17 which extends diagonally across the chest of the seat occupant 4, to the tongue 12, and further portion 18 which extends across the lap of the seat occupant to the anchorage 14.

An air-bag 19 is provided, the air-bag, in this embodiment, being mounted within the dashboard 20 of the motor vehicle. It is to be noted, however, that the air-bag may be mounted within a steering wheel if the seat occupant 4 is the driver of the motor vehicle.

The central processor unit 8 is provided to moderate or inhibit inflation of the air-bag 19 depending upon the position of the seat occupant 4, and/or to control a load-limiter associated with the safety-belt. The load-limiter will allow some seat-belt 9 to be paid-out, after the retractor 10 has locked in an accident situation, with energy being absorbed. The load-limiter may be the load-limiter present within the retractor 10. If the seat occupant 4 is leaning forwardly, as shown in phantom in FIG. 2, so that the distance between the chest of the seat occupant $x_C$ and the air-bag 19 $x_B$ ($x_B$-$x_C$) is below a predetermined minimum distance, then the air-bag 19 is only to be inflated in a relatively gentle manner, so that the air-bag is only partially inflated, or inflation of the air-bag is to be totally inhibited or the air-bag is vented. The danger from the air-bag 19 is actually related to the position of the stiff, load-taking surface of the occupant, i.e. the chest or rather the chest bone relative to the air-bag housing before the air-bag is inflated. The less the distance between the chest bone and the air-bag housing, the greater the danger, unless the operation of the air-bag is modified. The operation of the air-bag may be optimised in dependence on the position of the occupant or their chest bone relative to the air-bag housing initially containing the air-bag 19.

It is to be appreciated that the central processor unit 8 is initially provided, from the sensor 7, with a signal that is indicative of the position of the seat 1 relative to the air-bag 19. When the seat occupant 4 initially occupies the seat 1, the seat-belt 9 is in a fully retracted initial position. As the seat occupant 4 becomes belted into the seat, a length of safety belt 9 is withdrawn as the seat-belt is moved to the position illustrated in FIG. 1 with the tongue 12 mounted within the buckle 13. The central processor unit 8 receives a signal as the tongue 12 is received in the buckle 13. However, as the seat occupant 4 occupies the ordinary position leaning backward, some seat-belt 9 is retracted back into the retractor 10. The measuring mechanism 11, together with the central processor unit 8 may effectively monitor the length of the safety-belt 9 withdrawn from the retractor relative a reference point, the reference point or reference value being set for example at the minimum length of belt withdrawn from the retractor 10 after the tongue 12 has been engaged with the buckle 13. Thus the measuring mechanism 11 will continuously or repeatedly determine the length of belt withdrawn from the retractor, and update a stored value representative of the minimum length, if a new minimum value, less than the current minimum value, is reached.

Should the seat occupant 4 move the seat 1, after the seat belt 9 has been buckled and the measuring mechanism 11 is measured a value of the minimum length of the belt withdrawn to the retractor 10 when the occupant is in the ordinary position, the central processor unit 8 determines a new reference point or reference value, by adjusting the original reference point or reference point to a an extent related to the amount and direction of the adjustment of the seat position along track 6.

The reference point or reference value for the minimum length of belt 9 must correspond to a situation in which the seat occupant 4 is in the ordinary position, sitting well back and not leaning forwardly. Assuming that the thickness of the occupant's torso (distance between the rear surface of the back of the seat occupant and the front surface of the chest bone) of a vehicle occupant is substantially the same or within a normal range when considered with seat position for all vehicle occupants, it is possible, to determine the position of the front part of the chest (chest bone) of the seat occupant 4 relative to the air-bag 19, when the occupant is in the ordinary position, as this is dependent purely upon the position of the seat 1 as a consequence of the adjustment of the carriage 5 on the rails 6. The measured minimum length of belt 9 withdrawn from the retractor 10 corresponds with this position of the chest (chest bone) of the seat occupant.

Should the seat occupant move forwardly, to the position shown in phantom in FIG. 1, a further length of safety belt 9 will be paid out, and the extent of paying out of the safety belt beyond the minimum length will be indicative of the degree of forward movement of the seat occupant from the "ordinary" position. Consequently, by determining the amount of seat-belt 9 paid out in excess of the minimum amount, and by taking into account the position of the seat 1, it is possible for the central processor unit 8 to determine, at least to a first approximation, the position of the front part of the chest (chest bone) of the seat occupant 4, and to moderate or inhibit deployment of the air-bag 19 appropriately.

It is possible that in an enhanced embodiment of the invention the angle of rake t of the seat back rest 3 (recline angle) would also be taken into account. In such an embodiment a sensor will sense the degree of rake of the backrest 3 and pass an appropriate signal to the central processor unit 8.

Figure 2:
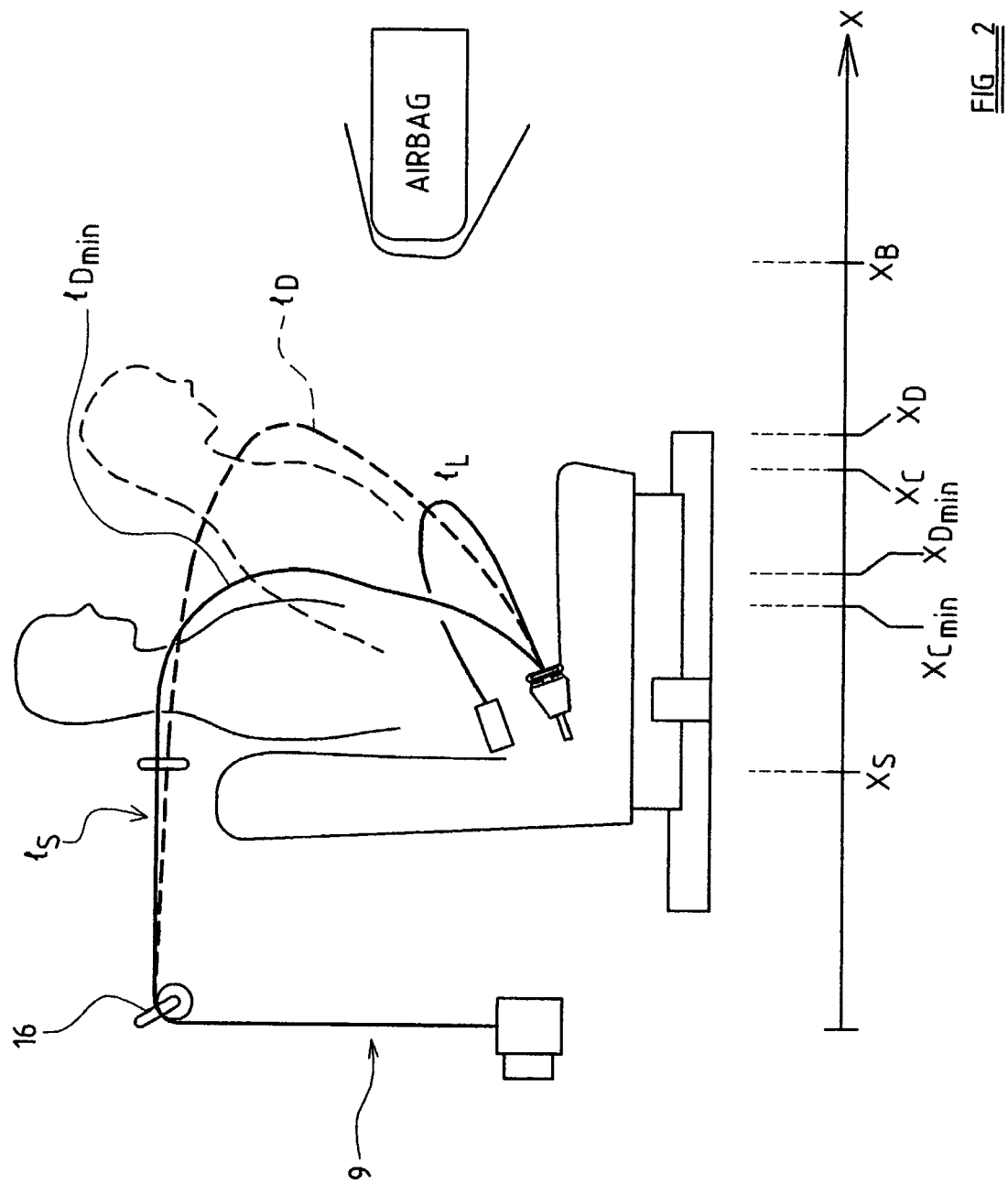
FIG. 2 is a view corresponding to FIG. 1 indicating various positions and parameters as used in a mathematical analysis that forms part of the following description.

Turning now to FIG. 2, the essential structural features of the safety arrangement are shown, although the central processor unit 8, for the sake of clarity of illustration, has been omitted. A x axis is shown which is parallel to the longitudinal axis of the vehicle, the axis being marked with various reference points.

$x_S$ is measured at the backrest 3 of the seat 1. $x_C$ is the position of the chest (chest bone) of the seat occupant, the chest (chest bone) having an ordinary position $x_{Cmin}$, when the seat occupant is in the ordinary position and having a current position $x_C$, which could be as shown in the forward position.

$x_D$ relates to the position of the diagonal part 17 of the seat-belt. This is slightly in front of the position $x_C$ of the chest (chest bone) of the seat occupant due to the thickness of the clothing worn by the seat occupant (and soft body tissues in front of the chest bone). $X_B$ shows the position of the air-bag 19 cover which, in the illustrated embodiment, is the dashboard 20.

The seat-belt 19 has three portions of varying length. The portion of the seat-belt 9 which extends from the retractor 10 to the pillar loop 16 is of a fixed length. The first portion of variable length extends from the pillar loop 16 to a point adjacent the shoulder of the seat occupant 4 in line with the seat back. This is the distance $l_S$ as shown in FIG. 2, and corresponds to the distance between the origin of the x axis and the point $x_S$ which relates to the back rest 3. Thus the distance $l_S$ is dependent upon the position of the seat 1 as adjusted along the seat track 6.

The second portion of seat-belt of variable length is the diagonal portion which extends to the tongue 12, being the seat-belt portion 17. This portion has a length $l_D$. The length of this portion 17 of the seat-belt 9 varies with the thickness of the chest (chest bone), $d_c$, the thickness of clothing or jacket worn by the seat occupant $d_j$ and the degree of leaning forward of the seat occupant $d_f$.

The third position is the lap belt section 18, having the length $l_L$.

It is to be understood that:

$$x_{Dmin} - x_{Cmin} = x_D - x_C = d_j; \quad x_{Cmin} - x_S = d_c; \quad x_D - x_{Dmin} = d_f$$

The distance of importance, in determining whether the inflation of an air-bag 19 should be modified or inhibited, is the distance between the chest (chest bone) and air-bag:

$$d_{CB} = x_B - x_C$$

The present invention considers that the thickness of the torso to the front surface of the chest bone only varies a little between large persons and small persons. It has been found typically $d_C$ is 20+/−3 cms. It can, therefore, be assumed that, to a first approximation, for any case dc is 20 cms, and the appropriate calculation as to the distance between the front of the chest (chest bone) and the air-bag 19 can be calculated based on this assumption.

The distance $d_{CB}$ is a function of $x_C$, as $X_B$ is effectively constant.

At any moment the total variable length of the seat-belt $l_T$ is:

$$x_C - x_{Cmin} = x_D - x_{Dmin} = f(\Delta l), \Delta l = l_D - l_{Dmin}$$

$$l_T = l_S + l_D + l_L$$

$x_{Cmin} = x_S + d_c = f(x_S)$, as $d_c$ is assumed to be a constant
$x_S$=is measured by the seat track sensor.
Thus $d_{CB} = f(x_C) = f(f(\Delta l) + x_{Cmin}) = f(f(\Delta l) + f(x_s)) = f(\Delta l, x_s)$ After the seat occupant has been buckled in position, the retractor 10 will tend to retract seat-belt 19, and a minimum value of $l_T$, a value of $l_{Tmin}$ can be measured as follows:

$$l_{Tmin} = l_S + l_{Dmin} + l_L$$

$l_S$ relates to $x_S$, the position of the seat 1 and varies only when the seat is moved. $l_L$ is related to the size of the hips or belly of the seat occupant and is fixed after the belt is buckled but can vary a lot between different occupants.

The value of $l_{Tmin}$ can be stored as the reference value, and should the seat occupant further move forwards, $l_D$ will increase, thus increasing the overall length of belt withdrawn. The increase in $l_D$ is indicative of the degree of movement of the chest (chest bone) of the seat occupant forwardly of the ordinary position, and thus the parameter can be used to control deployment of the air-bag 19.

If the seat 1 is moved forward after the belt 9 is buckled, a new reference value has to be calculated, because the new relevant $l_{Tmin}$ is bigger than the old one. This could be done by using the latest $l_{min}$ after that the seat has been moved, but a relevant reference could be determined more quickly by calculating a new reference as $l_{min\ new} = l_{min\ old} + \Delta l_s \approx l_{min\ old} + \Delta x_s$, $\Delta x_s$ being the change in seat position. This is true, if $l_s$ is almost parallel with the seat track 6.

However, if the belt length is estimated by measuring the angle of the retractor spool, you have to know the function $l = f(\alpha)$. See FIG. 3.

Because this is not a linear function, $\Delta l \neq f(\Delta \alpha)$ but only $\Delta l \approx f(\Delta \alpha)$ within a limited range of $\alpha$.

Also the reference value $\alpha_{min}$ is set after the belt 9 is buckled. If the seat 1 is moved after that, a new reference value could be calculated from the curves in FIG. 4, showing $\alpha_{min}$ as a function of the seat position $x_s$. If the seat 1 is moved forward the curve for a big occupant should be used and if it is moved rearward the curve for a small occupant should be used. This is to ensure that the real position of the occupant is not closer to the dashboard 20 than the calculated position. If, for example, the seat is moved forward $\alpha_{min}$ new=$\alpha_{min\ old}$+ $\Delta\alpha_{big}$ where $\Delta\alpha_{big}=f(x_{sold}, x_{snew})$, according to the curve for a big occupant. $x_{sold}$ is the old position of the seat and $X_{snew}$ is the new position. Gradually when the occupant has reached the ordinary leaning back position, the reference value will be corrected.

However, $\Delta l = f(\Delta\alpha, \alpha)$. Thus the accuracy could be improved if a measurement is effected relative an absolute fixed reference (that does not change with size of occupant and position of seat).

The invention considers detecting the position of the occupant from the amount of belt withdrawn relative a reference, if the position of the seat is known. This means that if the seat is fixed, like normally rear seats are, a seat position sensor is not needed.

While the above description constitutes the preferred embodiment of the present invention, it will be appreciated that the invention is susceptible to modification, variation and change without departing from the proper scope and fair meaning of the accompanying claims.

The invention claimed is:

1. A safety arrangement for a motor vehicle, the motor vehicle having a seat moveable in the motor vehicle and being provided with a safety belt and an associated retractor for use by an occupant of the seat, the safety arrangement comprising a first sensor for measuring a parameter corresponding to the length of the belt withdrawn from the retractor relative to a predetermined reference value, a second sensor for measuring the position of the seat, a buckle being provided with a third sensor to indicate when the safety belt is buckled in position, the predetermined reference value being the minimum belt length remaining withdrawn from the retractor after the belt has been buckled up, and a processor unit to process signals from the first, second and third sensors to control the performance of a load-limiter for the safety-belt, wherein the processor unit is configured to continuously or repeatedly updated the reference value determining a new reference value when the seat is moved and storing the new reference value when a new minimum belt length remaining withdrawn from the retractor is determined that is less than the current minimum length, the new reference value being determined from the minimum length of belt withdrawn from the retractor after the seat is moved, the processor unit being further configured to process signals corresponding to the new minimum belt length and the new position of the seat.

2. A safety arrangement according to claim 1 wherein the processor unit utilises signals from the second sensor to determine the ordinary position of the front part of the chest bone of the seat occupant relative to an air-bag, that position corresponding to the predetermined reference value of belt length.

3. A safety arrangement according to claim 1 wherein the processor unit, based on the position of the seat, determines the ordinary position of the front part of the chest bone of the seat occupant relative to an air-bag, that position corresponding to the predetermined reference value of belt length.

4. A safety arrangement according to claim 1 wherein a measured change in the length of the seat belt withdrawn from the retractor, relative to the predetermined reference value is utilised by the processor unit to estimate the longitudinal change in position of the front part of the chest bone of the seat occupant.

5. A safety arrangement according to claim 1 wherein the parameter that is measured by the first sensor is the extent of the angular rotation of the spool of the retractor.

6. A safety arrangement according to claim 1 wherein the processor unit is connected to an air-bag unit positioned in front of the vehicle seat and the processor unit controls the mode of performance of the air-bag.

7. A safety arrangement according to claim 6 wherein the processor unit controls the mode of performance of the air-bag by modifying the venting of the air-bag.

8. A safety arrangement according to claim 6 wherein the processor unit controls the mode of performance of the air-bag by moderating deployment of the air-bag.

9. A safety arrangement according to claim 6 wherein the processor unit controls the mode of performance of the air-bag by inhibiting deployment of the air-bag.

10. A safety arrangement according to claim 1 wherein the new reference value is determined by determining the change in the position of the seat and modifying the original predetermined reference value.

11. A safety arrangement according to claim 10 wherein the reference value is modified by a value corresponding to the distance of, and the direction of, the change in position of the seat.

12. A safety arrangement according to claim 10 wherein subsequently a new reference value is determined by determining the minimum length of belt withdrawn from the retractor and the position of the seat.

13. A safety arrangement for a motor vehicle, the motor vehicle having a seat moveable in the motor vehicle and being provided with a safety belt and an associated retractor for use by an occupant of the seat, and an air bag for providing impact protection for the occupant, the safety arrangement comprising a first sensor for measuring a parameter corresponding to the length of the belt withdrawn from the retractor relative to a predetermined reference value, a second sensor for measuring the position of the seat, a buckle being provided with a third sensor to indicate when the safety belt is buckled in position, the predetermined reference value being the minimum belt length remaining withdrawn from the retractor after the belt has been buckled up, and a processor unit to process signals from the first, second and third sensors to control the mode of performance of the air-bag, wherein the processor unit is configured to continuously or repeatedly updated the reference value determining a new reference value when the seat is moved and storing the new reference value when a new minimum belt length remaining withdrawn from the retractor is determined that is less than the current minimum length, the new reference value being determined from the minimum length of belt withdrawn from the retractor after the seat is moved, the processor unit being further configured to process signals corresponding to the new minimum belt length and the new position of the seat.

14. A safety arrangement according to claim 13 wherein the processor unit utilises signals from the second sensor to determine the ordinary position of the front part of the chest bone of a seat occupant relative to the air-bag, that position corresponding to the predetermined reference value of belt length.

15. A safety arrangement according to claim 13 wherein the processor unit, based on the position of the seat, determines the ordinary position of the front part of the chest bone of the seat occupant relative to the air-bag, that position corresponding to the predetermined reference value of belt length.

16. A safety arrangement according to claim 13 wherein a measured change in the length of the belt withdrawn from the retractor relative to the predetermined reference value is utilised by the processor unit to estimate the longitudinal change in position of the front part of the chest bone of the seat occupant.

17. A safety arrangement according to claim 13 wherein the parameter that is measured by the first sensor is the extent of the angular rotation of the spool of the retractor.

18. A safety arrangement according to claim 13 wherein the processor unit is connected to control the performance of a load-limiter for the safety-belt.

19. A safety arrangement according to claim 13 wherein the processor unit controls the mode of performance of the air-bag by modifying the venting of the air-bag.

20. A safety arrangement according to claim 13 wherein the processor unit controls the mode of performance of the air-bag by moderating deployment of the air-bag.

21. A safety arrangement according to claim 13 wherein the processor unit controls the mode of performance of the air-bag by inhibiting deployment of the air-bag.

22. A safety arrangement according to claim 13 wherein the new reference value is determined by determining the change in the position of the seat and modifying the original predetermined reference value.

23. A safety arrangement according to claim 13 wherein the reference value is modified by a value corresponding to the distance of and the direction of the change in position of the seat.

24. A safety arrangement according to claim 13 wherein subsequently a new reference value is determined by determining the minimum length of belt withdrawn from the retractor and the position of the seat.

* * * * *

UNITED STATES PATENT AND TRADEMARK OFFICE
CERTIFICATE OF CORRECTION

PATENT NO. : 7,644,798 B2  Page 1 of 1
APPLICATION NO. : 10/589908
DATED : January 12, 2010
INVENTOR(S) : Anders Lenning It is certified that error appears in the above-identified patent and that said Letters Patent is hereby corrected as shown below:

In the Claims

In claim 1, column 7, line 48, delete "updated" and insert --update--.

In claim 13, line 50, after "repeatedly" delete "updated" and insert --update--.

Signed and Sealed this

Thirteenth Day of July, 2010

David J. Kappos
*Director of the United States Patent and Trademark Office*